United States Patent
Ramirez

(12) 
(10) Patent No.: US 7,315,961 B2
(45) Date of Patent: Jan. 1, 2008

(54) BLACK BOX RECORDER USING MACHINE CHECK ARCHITECTURE IN SYSTEM MANAGEMENT MODE

(75) Inventor: Nick Ramirez, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 10/180,134

(22) Filed: Jun. 27, 2002

(65) Prior Publication Data

US 2004/0003313 A1 Jan. 1, 2004

(51) Int. Cl.
*G06F 11/00* (2006.01)

(52) U.S. Cl. .............................. 714/15; 714/6; 714/37

(58) Field of Classification Search ................ 714/6, 714/15, 37
See application file for complete search history.

(56) References Cited

U.S. PATENT DOCUMENTS

| | | | | |
|---|---|---|---|---|
| 4,593,391 A | * | 6/1986 | Mizushima et al. | 714/45 |
| 6,041,375 A | * | 3/2000 | Bass et al. | 710/302 |
| 6,119,246 A | * | 9/2000 | McLaughlin et al. | 714/27 |
| 6,502,208 B1 | * | 12/2002 | McLaughlin et al. | 714/25 |
| 6,704,888 B1 | * | 3/2004 | Caudrelier et al. | 714/37 |
| 6,775,698 B1 | * | 8/2004 | Simone | 709/221 |

* cited by examiner

*Primary Examiner*—Marc Duncan
(74) *Attorney, Agent, or Firm*—Guojun Zhou

(57) ABSTRACT

An arrangement is provided for a black box recorder using machine check architecture in system management mode. A machine check architecture collects and registers the collected status and error information. After receiving an interrupt, a black box recording mechanism records the registered error information.

13 Claims, 5 Drawing Sheets

BLACK BOX RECORDER USING MACHINE CHECK ARCHITECTURE IN SYSTEM MANAGEMENT MODE

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to system management. Other aspects of the present invention relate to recording hardware malfunction information.

Hardware platform of a computing device may comprise different components that work together in concert to support various functions. For example, a personal computer may comprise a central processing unit (CPU), a memory, a bus, and a hard disk. An operating system (OS) may run on such an integrated hardware platform. Different applications may then run on top of the OS. Malfunction of either a hardware component or a software application may cause the OS to crash.

In the event of a system crash, an underlying computing device such as a personal computer may subsequently need to be rebooted to either determine the cause or to restore the system. Whether the system can be restored may depend on the cause of the problem. For example, if it is a software problem, the system may be able to recover to achieve the system status prior to a crash. If it is due to hardware problem, the system may not be able to recover without replacing the malfunctioning part. Therefore, identifying the cause of a crash may allow a faster restoration. For example, activating which appropriate reboot procedure may be determined based on an identified cause.

Some system platform may include a machine check architecture. Such a machine check mechanism may collect information related to system management and may offer an accurate depiction of the operational status of the system. For example, it may observer errors occurred, for example, within CPU and external bus. However, when a system crashes, such collected information may disappear so that it can not be used in assisting the recovery post modem.

Some system platform may also include different protective modes such as a system management mode in Intel architecture. A system management mode may allow high priority and full access to input and output (I/O) and memory and can be used independently of the OS. Currently, such system management mode is not effectively utilized.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
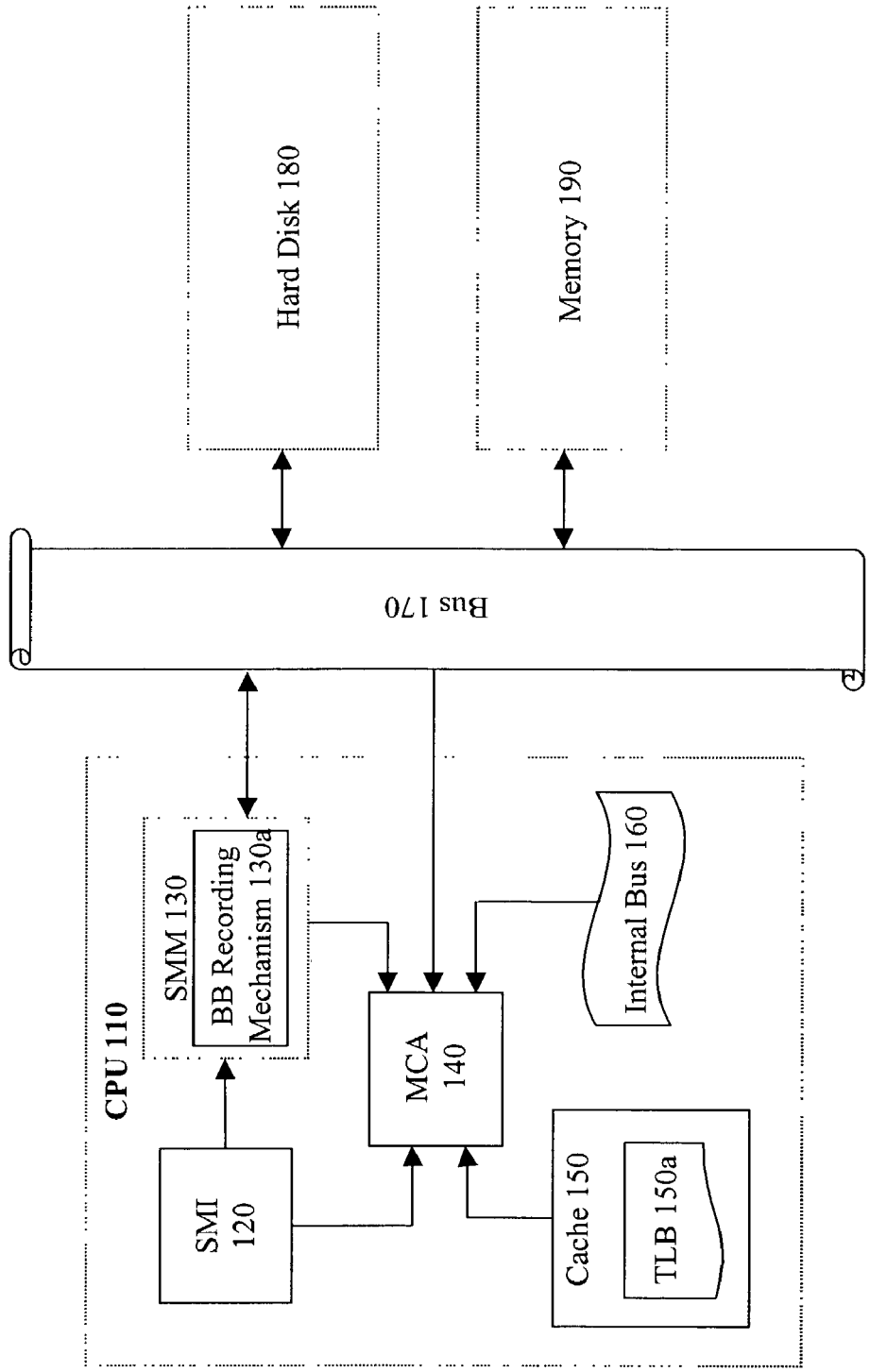
FIG. 1 depicts a framework that facilitates black box error information recording in the event of a system interrupt, according to embodiments of the present invention.

FIG. 1 depicts a framework 100 that facilitates black box error information recording in the event of a system interrupt, according to embodiments of the inventions. The framework 100 may be realized on a computing device (not shown), which may include a personal computer, a personal data assistant (PDA), or a laptop. In the framework 100, a central processing unit (CPU) 110 hosting various components may be connected, via a bus 170, to a plurality of peripherals linking to the computing device. The CPU 110 may include, but not limited to, a system management interrupt (SMI) 120, a system management mode (SMM) 130, a machine check architecture (MCA) 140, a cache 150 which may include a translation lookaside buffer (TLB) 150, and an internal bus 160. The peripherals may include, but not limited to, a hard disk 180 or a memory 190.

The MCA 140 may be inherent to a system architecture. For instance, a machine check architecture may be inherent to Intel architecture. The MCA 140 may be responsible for continually monitoring and collecting operational information associated with various parts in the computing device and offer a depiction of errors occurred, for example, within CPU or an external bus. Operational information may include status information or error information. The former may specify the operational status of an underlying monitored device. For instance, the MCA 140 may monitor the operational status of various hardware devices such as the cache 150, the internal bus 160, the bus 170, the hard disk 180, and the memory 190. Hardware status information may be registered in the MCA 140. The MCA 140 may also monitor the operational status of software such as an application running on the CPU 110.

Figure 2:
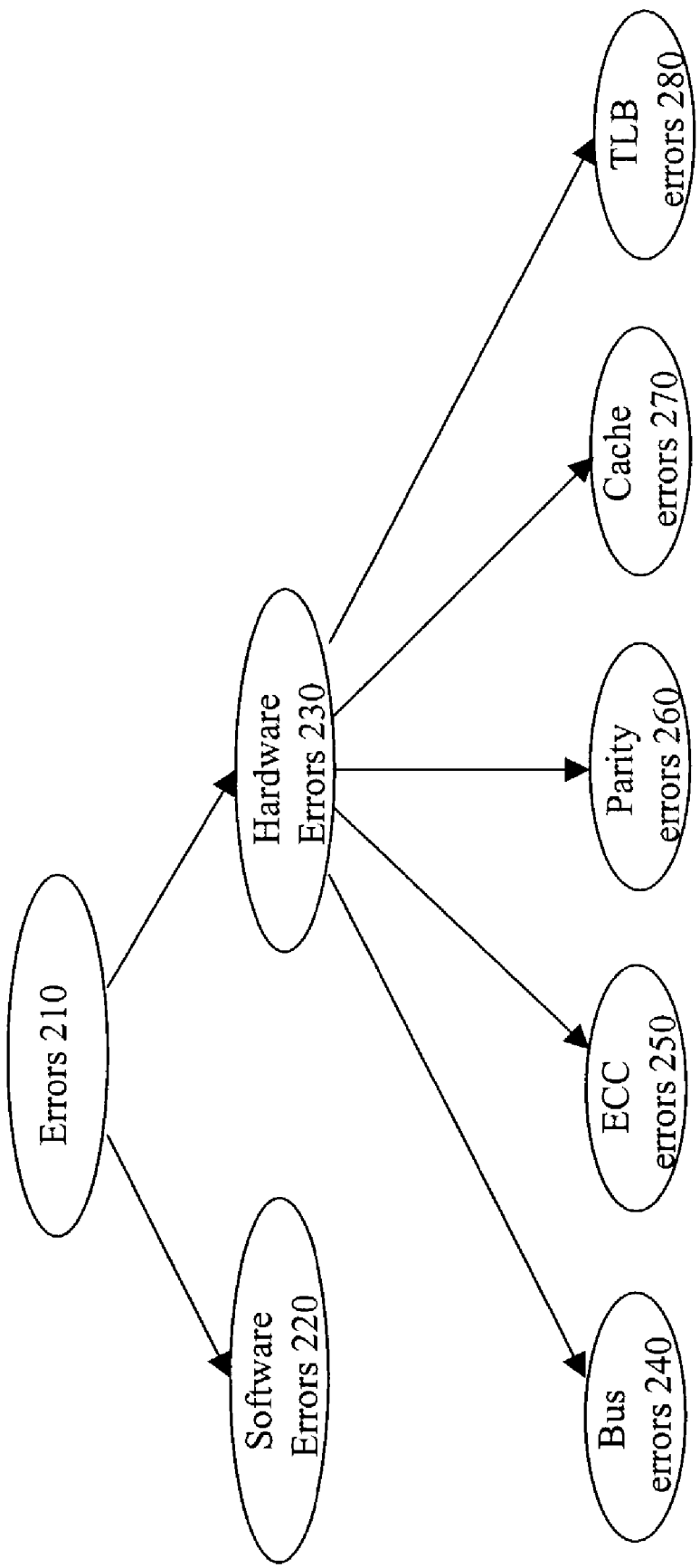
FIG. 2 illustrates exemplary types of black box errors, according to an embodiment of the present invention.

When a monitored device is in error, the status information associated with the device may indicate that an error has occurred. In such an event, the MCA 140 may collect the corresponding error information. The MCA 140 may be triggered by a software management or by some system interrupt. The MCA 140 may collect different kinds of error information. For example, it may collect parity error or data corruption. FIG. 2 illustrates exemplary types of errors, according to an embodiment of the present invention. Depending on the type of a monitored component, an error 210 may be a software error 220 or a hardware error 230. Each hardware device may be associated with one or more particular errors. For example, the bus 170 may be associated with bus errors 240. The internal bus 160 may be associated with parity errors 260, the cache 150 may be associated with cache errors 270. Error checking and correction (ECC) error 250 may relate to the information about which bit is in error. In addition, TLB errors 280 may be related to the TLB component 150a in the cache 150 in predicting a cache hit.

The MCA 140 may collect status and error information on a regular basis. It may also collect such information after being activated by some system interrupt. The SMI 120 is responsible for generating a system interrupt. The rate or timing of issuing interrupts may be governed by either a timer or an error. With a timer, the SMI 120 may issue an interrupt at a regular basis according to some pre-defined time interval. Such a regular interrupt schedule may be superseded by system errors. In that case, the SMI 120 issues an interrupt upon being triggered by a system error and the interrupt further triggers the MCA 140 to collect status and error information of the monitored components. Such collected information provides a description of the operational condition of the monitored components at the moment of the interrupt. Recording such information may help to reach an understanding of the cause of a system failure and to assist in determination of an appropriate and effective recovery from such a system failure.

The SMM 130 is a special protective mode, inherent in Intel architecture and designed for system management purposes. While this mode is not normally used by an operating system (OS), it can be used independently of the OS. The system management mode allows high priority and full access to input and output (I/O) and memory. In framework 100, it may be utilized to host a black box recording mechanism 130a. After being activated by a system interrupt issued by the SMI 120, the black box recording mechanism 130a residing in the SMM 130 actively gathers information relevant to the system failure from the MCA 140 and records such information for off-line access. To determine relevant information to be recorded, the black box recording mechanism 130a communicates with the MCA 140, examines the status information collected by the MCA 140 to identify the error information to be recorded. The gathered information may be recorded on a medium that is non-volatile such as a file stored on a hard disk.

Figure 3:
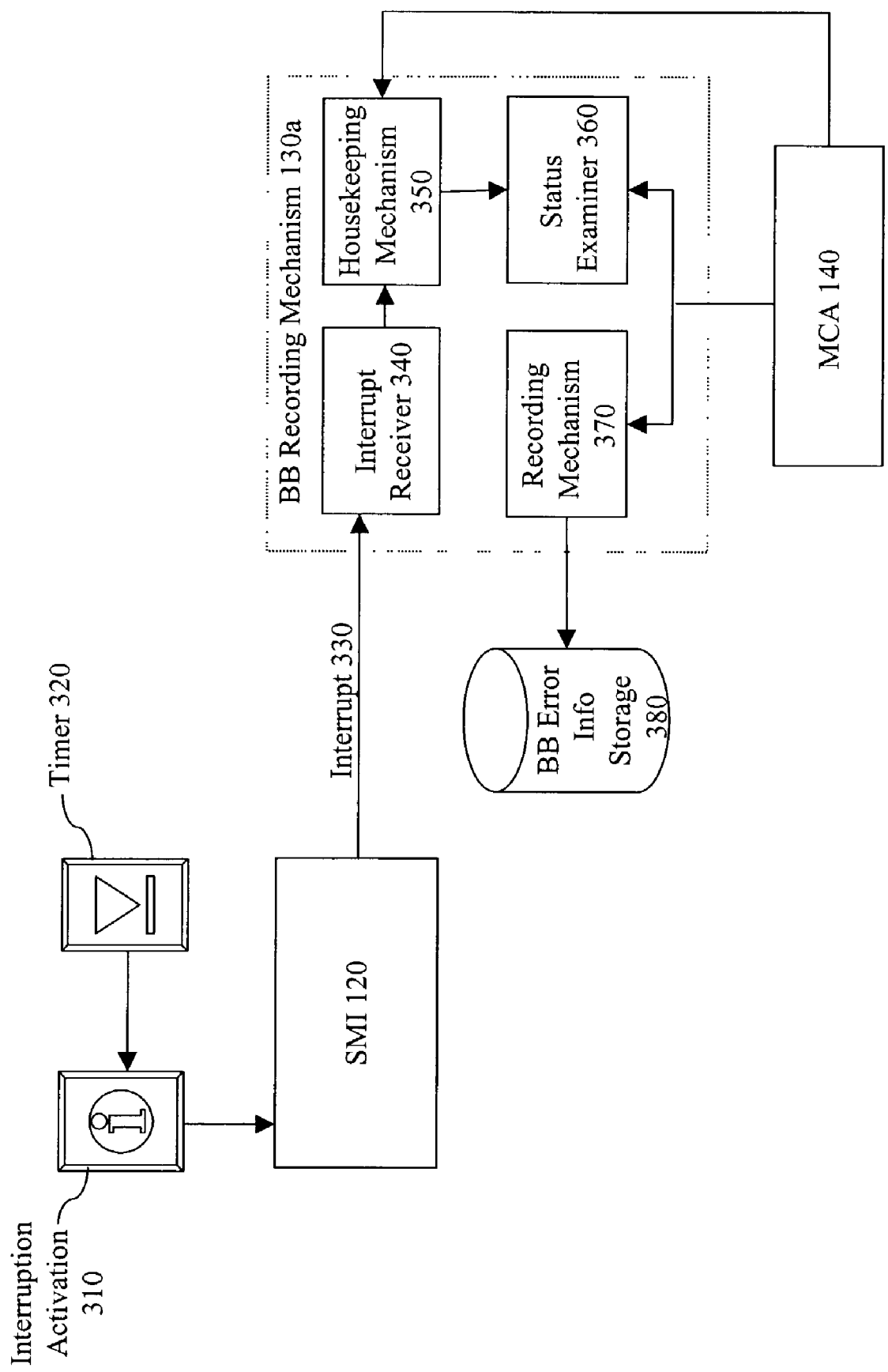
FIG. 3 depicts the internal structure of a black box recording mechanism, in relation to a system management interrupt (SMI) and a machine check architecture (MCA), according to embodiments of the present invention.

FIG. 3 depicts the internal structure of the black box recording mechanism 130a, in relation to the SMI 120 and the MCA 140, according to embodiments of the present invention. The black box recording mechanism 130a may comprise an interrupt receiver 340, a housekeeping mechanism 350, a status examiner 360, and a recording mechanism 370. The interrupt receiver 340 intercepts a system interrupt 330 issued by the SMI 120. The system interrupt 330 may be triggered by an interrupt activation mechanism 310 with the activation governed by, for example, a timer 320. The interruption activation mechanism 310 may also be triggered by a system failure condition.

After receiving the system interrupt 330, the interrupt receiver 340 may invoke the housekeeping mechanism 350 to perform some routine tasks. For example, routine housekeeping tasks may involve saving the state of the system at the moment of an interrupt. System state may be described in terms of pointers, flags, registers, or other status related information. The original system state saved during such housekeeping procedure may be used to restore the system in a proper order. Furthermore, the housekeeping mechanism 350 may continue to maintain certain functions. For example, the timer 320 that controls the interrupt activation may be kept running so that it can be used to reset a clock after the interrupt. In addition, the housekeeping mechanism 350 may continuously count the total number of non-fatal errors or time stamp data.

Based on the status information gathered during housekeeping, the status examiner 360 may check the status of various monitored devices. If a monitored component is in error, indicated by its status information, the status examiner 360 activates the recording mechanism 370 to gather the corresponding error information associated with the erred component from the MCA 140 and record the error information in the black box error information storage 380.

Figure 4:
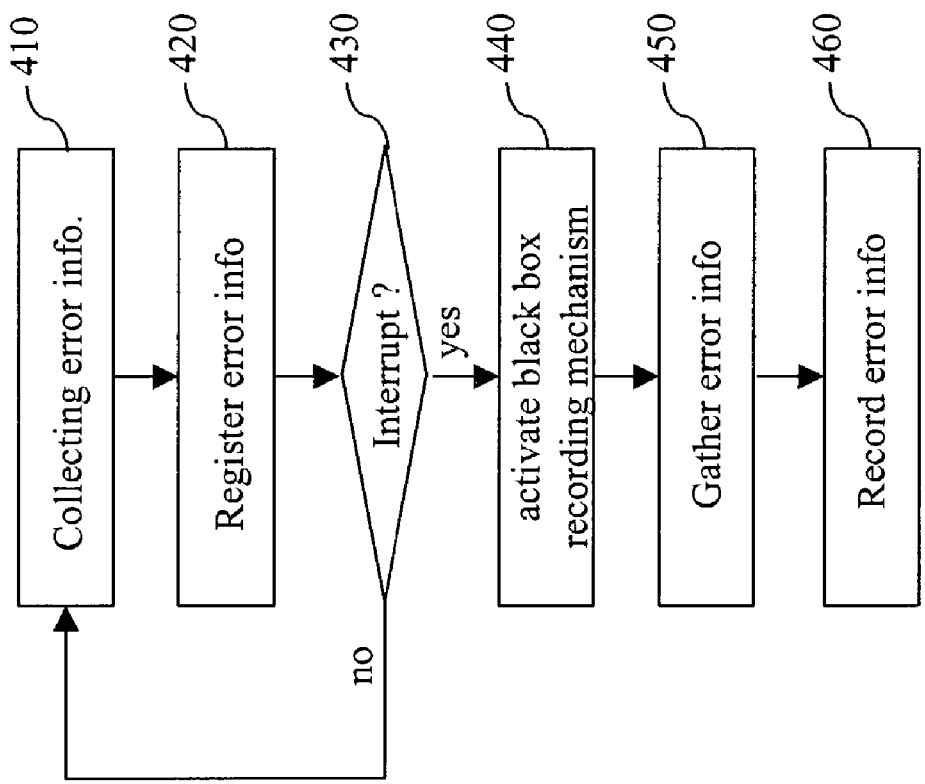
FIG. 4 is a flowchart of an exemplary process of a framework that facilitates black box error information recording in the event of a system interrupt, according to embodiments of the present invention.

FIG. 4 is a flowchart of an exemplary process, in which the framework 100 facilitates black box error information recording, according to embodiments of the present invention. The MCA 140 performs error information collection at act 410. Such collected information is registered at act 420. If an interrupt is intercepted, determined at act 430, the SMI 120 activates, at act 440, the black box recording mechanism 130a residing in the SMM 130. The black box recording mechanism 130a then gathers, at act 450, relevant error information from the MCA 140 and then records, at act 460, such error information. When there is no interrupt, the processing returns to act 410 to continue error information collection.

Figure 5:
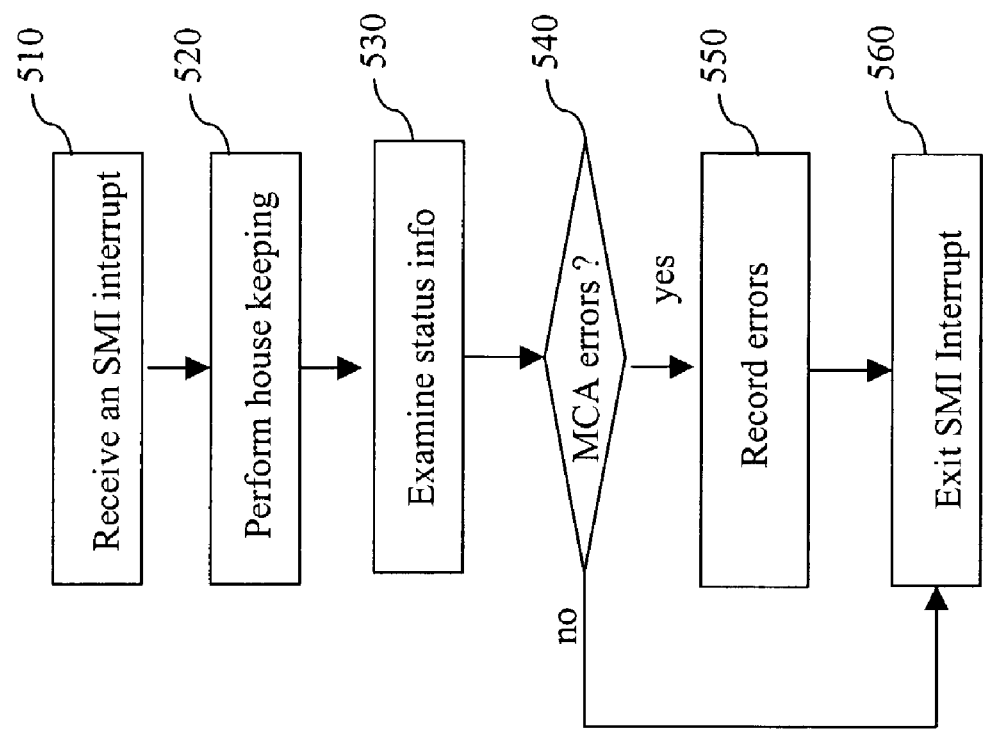
FIG. 5 is a flowchart of an exemplary process for a black box error recording mechanism, according to an embodiment of the present invention.

FIG. 5 is a flowchart of an exemplary process for the black box error recording mechanism 130a, according to an embodiment of the present invention. The interrupt receiver 340 first intercepts an SMI interrupt at act 510. This effectively starts a black box error information recording procedure. The housekeeping mechanism 350 performs, at act 520, certain housekeeping tasks. This may include gathering status information from the MCA 140. The status information is then examined, at act 530, by the status examiner 360 to determine whether MCA errors exist. If there is any MCA error, determined at act 540, the recording mechanism 370 gathers such error information from the MCA 140 and records it, at act 550, in the block box error information storage 380.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments and extends to all equivalent structures, acts, and, materials, such as are within the scope of the appended claims.

What is claimed is:

1. A method for recording errors of a computing system, comprising:
   collecting, by a machine check architecture, information including status information and error information;
   registering the error information;
   checking whether an interrupt is received; and
   performing, after receiving an interrupt, black box recording of the error information by performing housekeeping functions that includes gartering the status information, examining the status information, and if the status information indicates an error with a device, recording the error information related to the device;
   wherein said status information includes statuses of monitored devices in the computing system at the time of interrupt, said statuses being used to restore the system after errors being corrected.

2. The method according to claim 1, wherein the error information includes at least some of:
   bus errors;
   error checking and correction errors;
   parity errors;
   cache errors; and
   translation lookaside buffer errors.

3. The method according to claim 1, wherein said performing black box recording comprises:
   activating a black box recording mechanism; and
   gathering, by the black box recording mechanism upon being triggered, the error information collected by the machine check architecture.

4. The method according to claim 3, wherein the interrupt is initiated by at least one of:
   a timer; and
   a system error occurred.

5. The method according to claim 1, wherein said housekeeping functions further comprises continuously counting the total number of non-fatal errors.

6. A system for recording errors in a computing system, comprising:
   a system machine interrupt mechanism for generating a system interrupt upon being triggered;
   a machine check architecture for checking and gathering status and error information; and
   an SMM for hosting a black box recording mechanism that is activated by receiving an interrupt, communicates with the machine check architecture, performs housekeeping task, examines the status information collected by the machine check architecture to identify the error information to be recorded, and records the error information in a non-volatile storage device;
   wherein the-housekeeping task include gathering the status information collected by the machine check architecture for the status information examiner, and continuously counting the total number of non-fatal errors.

7. The system according to claim 6, wherein the system machine interrupt mechanism is triggered by at least one of a timer or occurrence of a system error.

8. The system according to claim 6, wherein the black box recording mechanism comprises:
   an interrupt receiver for intercepting the interrupt;
   a housekeeping mechanism for performing housekeeping tasks;
   a status information examiner for examining the status information from the machine check architecture; end
   a recording mechanism for recording, if the status information examiner indicates that there is at least one error in the machine check architecture, the at least one error.

9. An article comprising a machine-readable medium that contains instructions, which when executed by a processing platform, cause said processing platform to perform recording errors of a computing system via operations comprising:
   collecting, by a machine check architecture, information including status information and error information;
   registering the error information;
   checking whether an interrupt is received; and
   performing, after receiving an interrupt, black box recording of the error information by performing housekeeping functions that includes gathering the status information, examining the status information, and if the status information indicates an error with a device, recording the error information related to the device;
   wherein said status information includes statuses of monitored devices in the computing system at the time of interrupt, said statuses being used to restore the system after errors being corrected.

10. The article according to claim 9, wherein the error information includes at least some of:
    bus errors;
    error checking and correction errors;
    parity errors;
    cache errors; and
    translation lookaside buffer errors.

11. The article according to claim 9, wherein said performing black box recording comprises:
    activating a black box recording mechanism; and
    gathering, by the black box recording mechanism upon being triggered, the error information collected by the machine check architecture.

12. The article according to claim 11, wherein the interrupt is triggered by at least one of:
    timer; and
    a system error occurred.

13. The article according to claim 9, wherein said housekeeping functions further comprises continuously counting the total number of non-fatal errors.

* * * * *

UNITED STATES PATENT AND TRADEMARK OFFICE
CERTIFICATE OF CORRECTION

PATENT NO. : 7,315,961 B2  Page 1 of 1
APPLICATION NO. : 10/180134
DATED : January 1, 2008
INVENTOR(S) : Nick Ramirez It is certified that error appears in the above-identified patent and that said Letters Patent is hereby corrected as shown below:

Column 5:
Line 10, "gartering" should be --gathering--.

Signed and Sealed this

Twelfth Day of August, 2008

JON W. DUDAS
*Director of the United States Patent and Trademark Office*